T. GLASCO.
CONNECTING RIM OR CIRCULAR WEDGE FOR DRAWING ON AND FASTENING WROUGHT OR CAST IRON RIMS ON RAILROAD WHEELS.
No. 4,447. Patented Apr. 4, 1846.
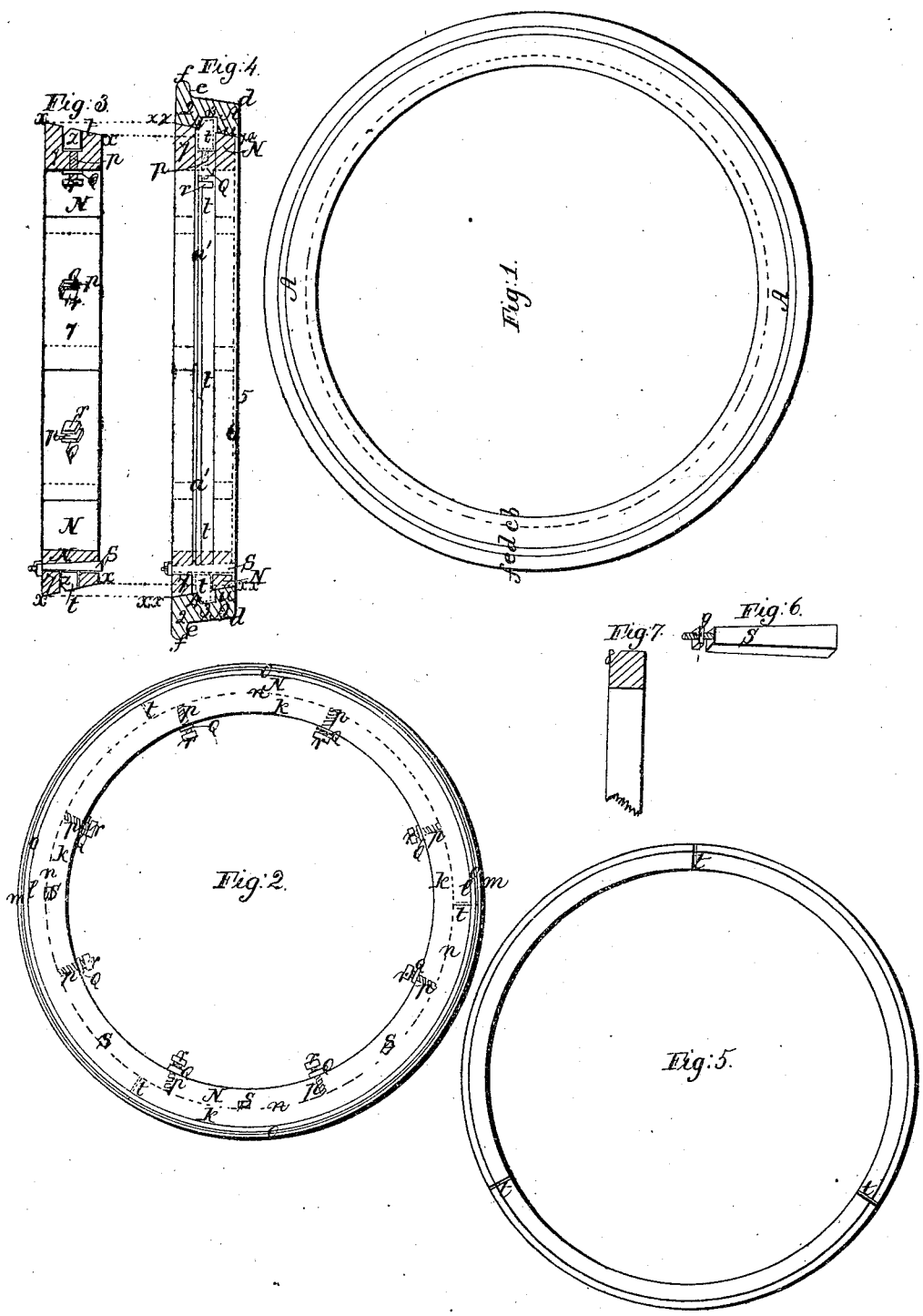

UNITED STATES PATENT OFFICE.

THOMAS GLASCO, OF WILMINGTON, DELAWARE.

CAR-WHEEL.

Specification of Letters Patent No. 4,447, dated April 4, 1846.

*To all whom it may concern:*

Be it known that I, THOMAS GLASCO, of Wilmington, in the county of Newcastle and State of Delaware, have invented a new and Improved Mode of Fastening and Connecting Rims and Centers on Railroad-Wheels; and I do hereby declare that the following is a full and exact description, reference being had to the annexed drawings, making a part of this specification, in which—

Fig. 1, (A, A,) represents the rim of a common railroad wheel; Fig. 2, (N, N,) the center of the wheel, to fit into the rim (A, A); Fig. 3, a cross section of the center (N, N); Fig. 4, a cross section of the wheel (A, A) in connection with the rim (A), center (N, N), and circular wedge ($t, t, t$); Fig. 5, the circular wedge ($t, t, t$); Fig. 6, the draw-wedge on a larger scale, and Fig. 7, profile section of a part of the circular wedge.

In (Fig. 1,) the dotted line (c) and the inside line (b) representing the slope of the inside face of the rim (A, A,) in which the sloping surface of the center (N, N,) has to be fitted, as shown at ($x, x$, Fig. 3), and at the rim by ($x x, x x$ Fig. 4). The lines ($e, d$) represent the slope of the tread of the wheel and ($f$,) the flange, Figs. 1 and 4). The rim (A, A,) has in the middle of the inside slope ($c b$) a groove, all around, as shown.

(Fig. 4) at (4, 3). This groove is beveled from the flange side, but the other side, being parallel with the face of the wheel,—the depth of said beveled groove is about one half its width,—the groove and the shape of the same is shown (Fig. 4 at 4, 3, $u$, 4, 3, $u$,) ($e, d$) the said tread of the wheel, and ($f$) the flange.

Fig. 2, (N, N). The center of the wheel being solid (and fixed and connected, as commonly with the spokes and hub) not shown in the drawings. The outside face ($m, l$) of said center (near the rim) is also sloping in the same degree as the slope of the rim (A A) before described, and has to fit into the inside face ($c, b$) Fig. 1, as illustrated (Fig. 3) by the dotted lines ($x, x$ to $x^a, x^a$ Fig. 4). In the middle of the outside face ($l, m$) of the center (N, N) is also a groove (c) corresponding with the groove of the inside of the rim (A, A) (4, 3, Fig. 4,) but so deep is the groove in the center as to receive in it the whole body of the circular wedge ($t, t, t$, Fig. 5,) as shown (Fig. 2) by a red line ($o$) dotted line ($n, n, n,$) the depth of the groove, and the letters ($t, t, t,$) the three divisions of the circular wedge. ($p, p, p$, &c.) are screws, with followers ($q q q$) and heads ($r r, r$, &c.) These screws are for the purpose set into the inner side of the center wheels, between the spokes, to force the circular wedge ($t, t, t$) outward from the center groove ($z z$, Fig. 3) into the opposite groove (4, 3) of the rim (A, A,) Fig. 4. The draw-wedges ($s$) may be used for the same purpose as the screws before mentioned when desired.

Fig. 5 represents the circular wedge, divided in three parts ($t, t, t$) beveled on one corner of its periphery as it is shown in Fig. 7, at 8,)—said bevel has to fit against the bevel of the rim-groove (4, 3, Fig. 4). Fig. 6 showing the draw-wedge ($s$) and ($q$) the screw and nut of the same (the said draw-wedge is not represented in the model).

Fig. 4 represents the rim (A, A,) the center (N, N,) and circular-wedge ($t, t, t,$) united and shown in a sectional view; ($a', a', a'$, and 4, 3—4, 3) the bevel of the wedge ($t, t, t,$) and rim (A, A,) showing in same time the joining of the bevels, and the manner of forcing by said bevels, the center (N, N) into the rim (A, A,); ($p, a, r,$) the screw—and ($s$) the draw-wedge. The center (N, N,) being narrower than the rim (A, A,) being made flush with the rim (A, A,) from the flange side, but recedes from the other about one inch; ($t, t,$) showing the circular wedge when forced out from the center into the groove (4, 3, 4, 3) of the rim (A) at Fig. 3. The center (N, N,) is represented as being withdrawn from the rim (A, A,) for better illustration, the circular wedge ($t, t, t,$) represented in the position ready to be fitted into the rim A A—other parts are already described.

To put the center (N, N,) and the rim (A, A,) together, to make them permanently connected, it requires that the screws ($p, p, p$, &c.) should be drawn back, so that the circular wedge ($t, t, t,$) becomes flush with the sloping surface of the center (N, N,), as represented in the drawing, Fig. 3 at $x x, x x$), after which the center (N, N,) is to be inserted into the inside of the rim (A, A) (following the dotted lines $x, x^a, x^a$). The rivets ($p, p, p$, &c.) (or the draw-wedge $s$) are screwed forward by which the bevel of the circular wedge ($t, t, t,$) is forced and of the center and into the groove of the rim (A) meeting the bevel surface of the rim groove (4, 3) and in sliding farther into the groove, the center (N, N,) is forced into the inner sloping surface of the rim (A) also, as shown by the line ($x^a$—$x^a$, Fig. 4) by which the center (N, N,) and the rim (A, A,) will be permanently united and connected.

What I claim as my invention and deside to secure by Letters Patent, is—

The mode of connecting the center (N, N,) with the rim (A, A) by the circular wedge (which is divided in three parts, $t, t, t,$) and fastening the same by the screws ($p, p, p,$ &c.), as described in the specification and illustrated by the annexed drawings.

THOMAS GLASCO.

Witnesses:
  S. PRETTYMAN,
  P. S. JOHNSON.